United States Patent [19]

Mirchandani

[11] Patent Number: 5,521,739
[45] Date of Patent: May 28, 1996

[54] RASTER OUTPUT SCANNER FOR REDUCING COLOR MISREGISTRATION

[75] Inventor: Vinod Mirchandani, Agoura, Calif.

[73] Assignee: Xerox Corporation, Stamford, Conn.

[21] Appl. No.: 358,503

[22] Filed: Dec. 19, 1994

[51] Int. Cl.[6] .................................................. G02B 26/08
[52] U.S. Cl. ........................ 359/216; 359/217; 250/236; 358/505; 347/232
[58] Field of Search .................................. 359/216–219; 348/203; 358/505, 474, 481, 494, 296, 302; 347/129, 134, 225, 232, 261, 259, 260; 250/234–236; 355/233

[56] References Cited

U.S. PATENT DOCUMENTS 4,160,939  7/1979  Damouth et al. ...................... 359/218

Primary Examiner—James Phan
Attorney, Agent, or Firm—Fariba Rad

[57] ABSTRACT

There is disclosed a raster output scanner for a color printing system which utilizes an indexed rotating polygon mirror in order to scan each given scan line from each latent image by a given facet in order to reduce misregistration caused by facet surfaces of a rotating polygon mirror.

3 Claims, 3 Drawing Sheets

RASTER OUTPUT SCANNER FOR REDUCING COLOR MISREGISTRATION

BACKGROUND OF THE INVENTION

This invention relates to a raster scanner, and more particularly, to a raster scanner optical system which utilizes an indexed rotating polygon mirror to reduce a problem known as misregistration of different colors on a scan line.

Typically, a single color raster scanner system has a light source, such as a laser, which emits a coherent light beam. The light beam is collimated in both the fast scan or tangential plane and in the cross scan or sagittal plane by multiple optical elements. The collimated light beam in the cross scan plane is focussed at a point near a facet of a rotating polygon mirror by a cylindrical optical element while in the fast scan plane the light beam remains collimated when the beam strikes the facet of the rotating polygon mirror.

The rotating polygon mirror causes the reflected beam to revolve about an axis near the reflection point of the rotating polygon mirror. This reflected beam can be utilized to scan a document at the input end of an imaging system as a raster input scanner or can be used to impinge upon a photosensitive medium, such as a xerographic drum (photoreceptor), in the output mode as a raster output scanner.

The light beam is modulated in accordance with the pixel information either at the laser diode (if the light source is laser diode) or prior to the rotating polygon mirror. In a raster output scanner, prior to scanning the modulated light beam, the surface of the photoreceptor is uniformly charged. Scanning the light beam across the surface of the photoreceptor, causes the electrostatic charge on the surface of the photoreceptor to selectively dissipate. The selection of the charge dissipation is based on the pattern of the modulated light beam which corresponds to the image of the document being printed. Once the light beam scans the photoreceptor for one page, the latent image of one page document being printed is transferred onto the photoreceptor.

The latent image will be made visible by developing it with toner. The toner is generally a colored powder that adheres to the latent image by opposing electrostatic charges. The developed image will then be fixed to a substrate such as plain paper by fusing techniques.

In a color printing system, a full color image is generated by combining four different colors (typically, cyan, yellow, magenta and black). Different printing systems utilize different approaches to generate full color. One approach is to use one raster output scanner and scan one page of document on the photoreceptor once and overscan the same document on the photoreceptor three times for one page of full color document. This approach is called a four pass scanner. Each time the photoreceptor is scanned for one page, all the scan lines of that one page are scanned for one color thus generating one latent image for one color. Also, each time the photoreceptor is overscanned, all the scan lines of that one page will be overscanned to generate one more overlapping latent image. Scanning the photoreceptor once for one document and overscanning it three more times generate a first latent image and three overlapping latent images over the first latent image. Each scan line from each overlapping image has to overlap the same scan line from the first image. By developing each latent image with a different color toner, a full color page of document will be generated.

It should be noted that there are various methods of developing the four colors such as developing the latent image generated on the photoreceptor and then overscanning the photoreceptor for the next color and continue the same procedure for all the colors or generate the four latent images all on a multi-level photoreceptor and then develop each latent image one by one.

Therefore, in the aforementioned approach, a single laser light beam will be utilized to scan the photoreceptor four times for one page.

In a color printing system, it is extremely important to have the four latent images overlap each other with high precision. Each scan line from each latent image must overlap the same scan line from the previous latent images. Misalignment by even a small fraction of a single pixel will produce a color tone error in the copy. This problem is called misregistration.

It is an object of this invention to reduce the misregistration problem.

SUMMARY

In accordance with the present invention, there is disclosed a four pass raster output scanner which utilizes an indexed rotating polygon mirror in order to reduce misregistration problem. The indexed rotating polygon mirror is used to ensure that the same line from each image will be scanned by a common facet in order to eliminate different errors introduced by different facets. By scanning the same scan line for each latent image by a common facet, the four scan lines generated by the common facet will have the same error causing the scan lines to overlap each other, thus reducing misregistration.

BRIEF DESCRIPTION OF THE DRAWINGS

FIG. 1 shows a raster output scanner of this invention which utilizes an indexed rotating polygon mirror in order to scan line 1 of an image by facet a;

DESCRIPTION OF THE PREFERRED EMBODIMENT

Figure 1:
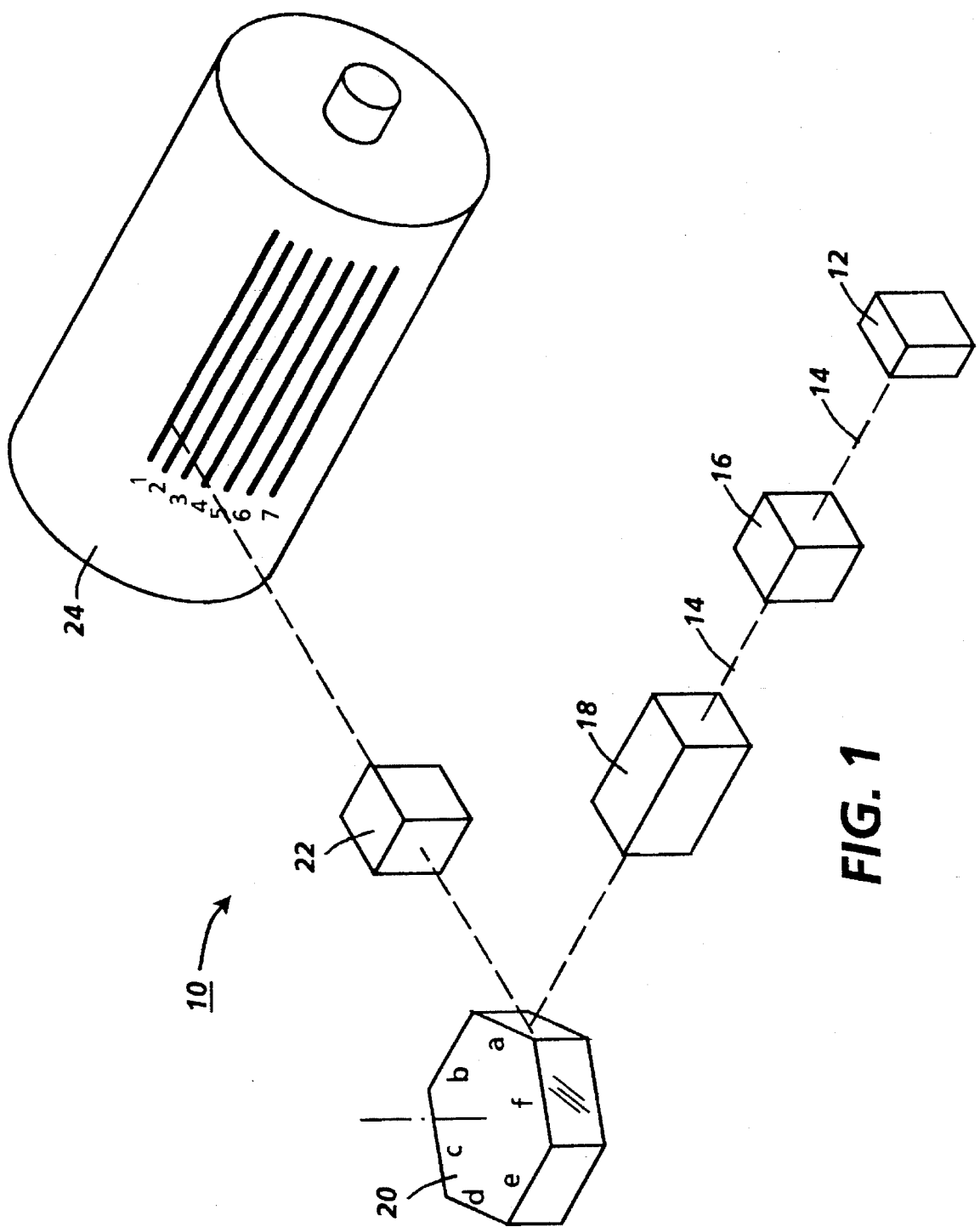

Typically, each optical element of a raster output scanner has manufacturing tolerances. The same is true for the rotating polygon mirror. In this invention, it is suggested that one problem of misregistration is caused by the tolerances of the facets of the rotating polygon mirror. Each facet of the rotating polygon mirror can have different tolerances compared to the other facets. Each facet can be tilted up or down or it might have a slight curvature. Each one of these tolerances cause the light beam to be reflected to a different direction. Different abnormalities on the surface of each facet will cause a different problem on the light beam being reflected by that facet.

One problem is known as wobble. Wobble is defined as the displacement of a scan line in the cross scan or sagittal plane from its intended position. Typically, a wobble error in an optical scanning system is caused by different factors such as the rotating facet not being exactly perpendicular to the optical axis of the raster scanning system. In this case, the beam reflected from the facet is thereby angled up or down for a small amount resulting in scan line displacement errors in the sagittal plane.

Another problem is known as jitter. Jitter is defined as the displacement of pixels on a scan line from their intended positions. Typically, a jitter in an optical scanning system is caused by different factors, one of which is the errors introduced by the surface of the facet. An unwanted curvature on the surface of the facet causes the light beam to be reflected with a slight deviation from its intended path which in turn causes jitter.

The problem of wobble and jitter are intensified in color printing systems due to the fact that the photoreceptor has to be scanned once and overscanned three times to generate four latent images for four different colors. In this process, if different facets are used to overscan the same line, each facet will introduce a different error. For example, one facet may introduce a wobble which causes the scan line to be above the intended position, another facet may introduce a wobble which causes the scan line to be below the intended position. Therefore, using four facets might generate four non-overlapping scan lines as oppose to four overlapping scan lines. In addition, each facet may introduce a different jitter which causes each pixel from each latent image which has to overlap the same pixel form another overlapping latent image to be placed differently.

As a result, using different facets to scan the same scan line of each latent image not only may generate four non-overlapping scan lines (misregistration) as oppose to one scan line with the combination of four colors but also may place the same pixel from the same four scan lines each at a different position (misregistration) as opposed to one pixel with the combination of four colors.

In this invention, in order to reduce the misregistration problem, an indexed rotating polygon mirror is utilized. By having an indexing system for the rotating polygon mirror, it will be guaranteed that the same scan line on all four colors will always be scanned by the same facet.

Referring to FIG. 1, there is shown a raster scanning system 10 of this invention which utilizes an indexed rotating polygon mirror. In this system 10, a light source 12 emits a single light beam 14 onto a collimator 16. The collimator 16 collimates the light beam and sends it to the pre-polygon optics 18. The pre-polygon optics 18 focuses the light beam 14 in the cross scan plane at a point near a facet of a rotating polygon mirror 20 while keeping the light beam 14 collimated in the fast scan plane. The facets a, b, c, d, e and f of the rotating mirror reflect the light beam onto post polygon optics 22 and the post polygon optics 22 images the light beam onto a photoreceptor 24.

The rotating polygon mirror 20 has an indexing system (not shown) which keeps track of the facet which scans the first line of an image and uses this information prior to the start of the scan for the image of the next color in order to use the same fact for the first line of the next image. The indexing system will be described in a greater detail subsequently. With this approach, if the first scan line of each image is scanned by facet a, each one of the following scan lines 2, 3, 4, 5 and of each image will be scanned by the following facets b, c, d, e and f respectively. Starting line 7, the polygon has made one full rotation and therefore line 7 will be scanned by facet a and the following lines will be scanned by the following facets.

Figure 2:
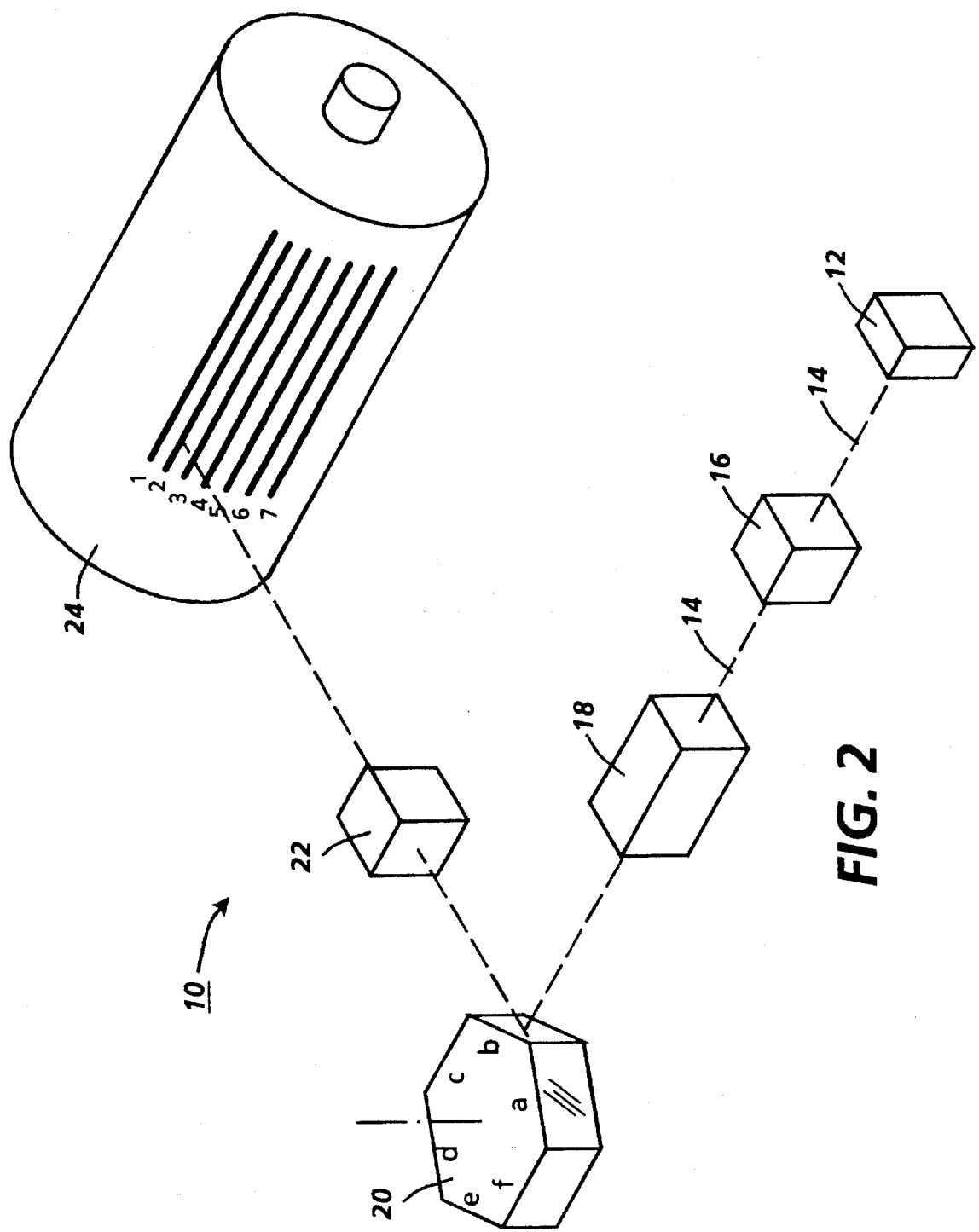
FIG. 2 shows a raster output scanner of this invention in which facet b scans line 2 of an image.

Overscanning the same line of each latent image with a common facet reduces the variation of the errors into one error. For example, if facet a causes a wobble and facet b causes a different wobble, by using only facet a to scan line 1 for all the colors, scan line 1 for all the colors will have the same wobble generated by facet a. Since the error (in this example wobble) for scan line 1 of each latent image is generated by the same facet, the error is the same for the scan line 1 of each four latent images and therefore they will all overlap each other. Also, referring to FIG. 2, if the scan line 1 of each latent image is scanned by facet a, the scan line 2 of each image will be scanned by facet b which is the following facet of facet a. Since scan line 2 of each image is scanned by facet b, they all will have the same error and therefore, they will all overlap each other.

The indexing system can be achieved by different methods. The simplest method is to select the number of facets to be equal to a fraction of the number of scan lines. In this approach since the number of the scan lines are a multiple of the number of the facets, the rotating polygon mirror makes full rotations from the first scan line to the last scan line. Also, the time between the last scan line of an image and the first scan line of the next image, which is called rephase time, is selected to be equal to the multiple of the time needed for a full rotation of the rotating polygon mirror. This approach will assure that at the last scan line of each image the rotating polygon mirror has completed a full rotation and at the end of the rephase time again the rotating polygon mirror has completed full rotations and therefore, the first line of the next image will be scanned by the same facet that scanned the first line of the current image.

For example, in FIG. 1, the rotating polygon mirror 20 has 6 facets a, b, c, d, e and f. If the number of the scan lines are 30 (6×5), then to scan lines 1 to 30, the rotating polygon mirror will make five full rotations. Therefore, if the first scan line is scanned by facet a, the last scan line (30th scan line) will be scanned by facet f and since during rephase the polygon makes full rotations, then at the end of rephase facet a will be ready to start scanning. As a result, the first line of the next image will be assured to be scanned by facet a.

In real life situations due to the tolerances of motor drive of the rotating polygon mirror or the tolerances of the motor drive of the photoreceptor, facet a may not precisely be synchronized with the start of the scan. Therefore, the indexing system not only has to assure that the first line of each image is scanned by the same facet it also has to synchronize the facet with the start of the first scan line.

Figure 3:
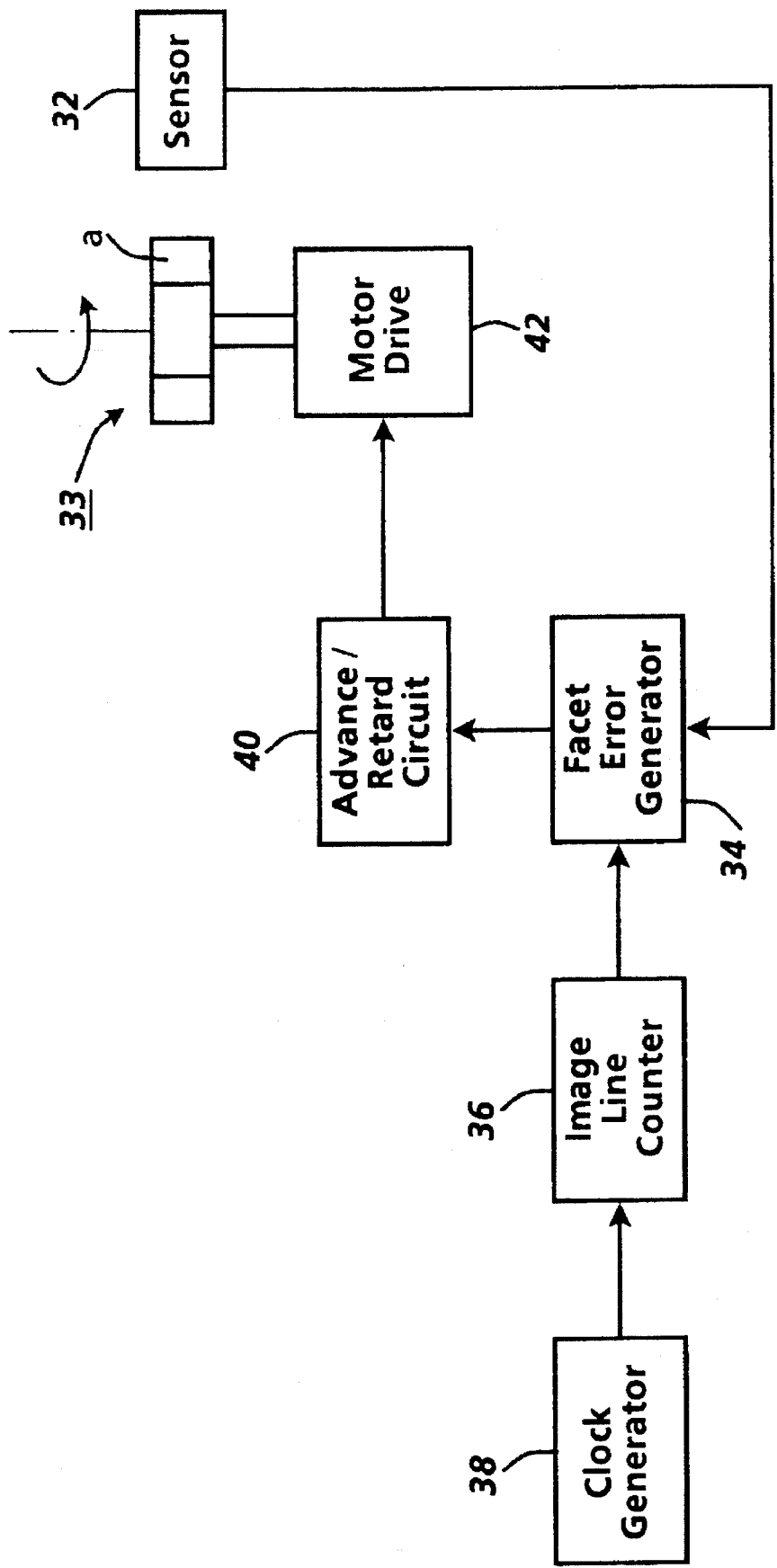
FIG. 3 shows a block diagram of an indexing system utilized in this invention.

Referring to FIG. 3, there is shown a block diagram of the indexing system 30 utilized in this invention. In the indexing system 30, a sensor 32 is placed next to a rotating polygon 33 to generate an index pulse each time facet a passes by the sensor 32. The index pulse generated by the sensor 32 will be sent to facet error generator 34. Facet error generator 34 also receives a signal from image line counter 36. Image line counter 36 is being clocked by scan line clock generator 38. The facet error generator 34 compares the index pulse generated by sensor 32 to the signal generated by the image line counter 36 and sends out the result to advance/retard circuit 40. The advance/retard circuit 40 sends a signal to the motor drive 42 of the rotating polygon 33 in order to speed up the rotating polygon mirror 33, speed down the rotating polygon mirror 33 or keep the rotating polygon mirror 33 at the same speed.

In operation, the scan line clock generator 38 generates a clock which indicates the start of each scan line. This clock causes the image line counter 36 to count up. Once the image line counter 36 counts up to the last number of the scan lines in an image (for example 5100 lines for 600SPI for 8.5 inch paper) on the following clock, it will generate a signal which is an indicator of the start of the rephase time.

Facet error generator 34 compares the index pulse from the sensor 32 to the rephase signal from image line counter

36. If the two signals are not synchronized, then the facet error generator 34 generates an error signal which will be sent to the advance/retard circuit 40. Depending on if the index pulse is ahead or behind the rephase signal, the advance/retard circuit 40 sends a signal to the motor drive 42 to slow down or speed up the motor drive 42 respectively. The amount of speed change will depend on the amount of mismatch between the index pulse from the sensor 32 to the rephase signal from image line counter 36. However, if the index pulse matches the rephase signal, the facet error generator 34 will not generate an error signal and the advance/retard circuit 40 will not send a speed change signal to motor drive 42 of the rotating polygon mirror 33 and as a result, the speed of the rotating polygon mirror 33 will be kept the same.

It should be noted that the speed of the motor drive will be adjusted only during the rephase time which is the time between two images. This is assure by the fact that the the facet error generator 34 compares the index pulse from the sensor 32 to the rephase signal from image line counter 36. Therefore, during the scan time of an image since there is no rephase signal, the facet generator will not generate a signal thus the advance/retard circuit 40 does not change the speed of the rotating polygon mirror.

It should also be noted that any indexing system which could control the rotating polygon mirror in order to scan the same line of each image with a certain facet can replace the enclosed indexing system of this invention.

It should further be noted that the indexed facets can also be used in color printing systems which generate more than four latent images.

What is claimed is:

1. In a scanning system for producing color images, wherein a light beam is scanned across a series of scan lines to produce a first image of the color image, and the light beam is again scanned across the same scan lines one or more times to produce one or more overlapping color images, said system comprising:

a light source emitting a light beam;

a medium;

scanning means having a plurality of facets located in the path of said light beam and being so constructed and arranged to scan said light beam in a tangential plane across said medium with each facet scanning a separate scan line across said medium; and wherein the improvement comprises means for selecting the same facet to scan the first scan line of each of the first and the overlapping images whereby the same scan line of each of the first and the overlapping images will be scanned by the same facet.

2. In the scanning means recited in claim 1, wherein the number of said plurality of facets is equal to a fraction of the number of scan lines.

3. In the scanning means recited in claim 1, wherein said selecting means comprises an indexing means.

* * * * *